(12) United States Patent
Kim et al.

(10) Patent No.: US 7,534,008 B2
(45) Date of Patent: May 19, 2009

(54) BACKLIGHT UNIT AND LIGHT SOURCE FOR USE IN SAME

(75) Inventors: Dae Hyun Kim, Kyungki-do (KR); Hae Yong Lee, Kyungki-do (KR); Yong Won Choi, Kyungki-do (KR)

(73) Assignee: Samsung Corning Precision Glass Co., Ltd. (KR)

( * ) Notice: Subject to any disclaimer, the term of this patent is extended or adjusted under 35 U.S.C. 154(b) by 113 days.

(21) Appl. No.: 11/431,591

(22) Filed: May 11, 2006

(65) Prior Publication Data

US 2007/0159832 A1 Jul. 12, 2007

(30) Foreign Application Priority Data

| Jan. 12, 2006 | (KR) | ................ 10-2006-0003427 |
| Feb. 21, 2006 | (KR) | ................ 10-2006-0016597 |
| Mar. 9, 2006 | (KR) | ................ 10-2006-0022160 |

(51) Int. Cl.
*F21V 9/00* (2006.01)
*F21V 5/00* (2006.01)

(52) U.S. Cl. ............... 362/231; 362/244; 362/246

(58) Field of Classification Search ............ 362/230, 362/231, 237, 240, 244, 246, 249, 612, 800, 362/29, 30, 84

See application file for complete search history.

(56) References Cited

U.S. PATENT DOCUMENTS

| 5,192,962 | A | * | 3/1993 | Nishida et al. ............... 353/98 |
| 5,893,633 | A | * | 4/1999 | Uchio et al. ................ 362/244 |
| 7,182,481 | B2 | * | 2/2007 | Shimura .................... 362/244 |
| 2002/0085390 | A1 | | 7/2002 | Kiyomoto et al. |
| 2002/0097354 | A1 | | 7/2002 | Greiner |
| 2006/0083023 | A1 | * | 4/2006 | Ayabe et al. ............... 362/607 |

FOREIGN PATENT DOCUMENTS

| JP | 09-064420 | 3/1997 |
| JP | 2002-324409 | 2/2000 |
| JP | 2002-094129 | 3/2002 |
| JP | 2002-133932 | 5/2002 |
| JP | 2002-343123 | 11/2002 |

OTHER PUBLICATIONS

Office Action mailed Nov. 25, 2008, issued in counterpart Japanese Patent Application No. 2006-142929.

* cited by examiner

*Primary Examiner*—Bao Q Truong
(74) *Attorney, Agent, or Firm*—Lerner, David, Littenberg, Krumholz & Mentlik, LLP

(57) ABSTRACT

A backlight unit includes a substrate, a plurality of light emitting diodes disposed at corners of a polygon or arranged side by side on the substrate, and a plurality of lenses coupled to the light emitting diodes for directing the lights emitted from the light emitting diodes in a predetermined direction. The light emitting diodes are comprised of at least three light emitting diodes capable of cooperating with each other to create a white light. Each of the lenses has an asymmetrical irradiation characteristic such that the lenses allow the lights to be irradiated on a predetermined target region and uniformly mixed with each other. The lenses are designed and oriented to irradiate the lights in an elliptical shape close to a rectangle toward a top portion of the backlight unit.

15 Claims, 17 Drawing Sheets

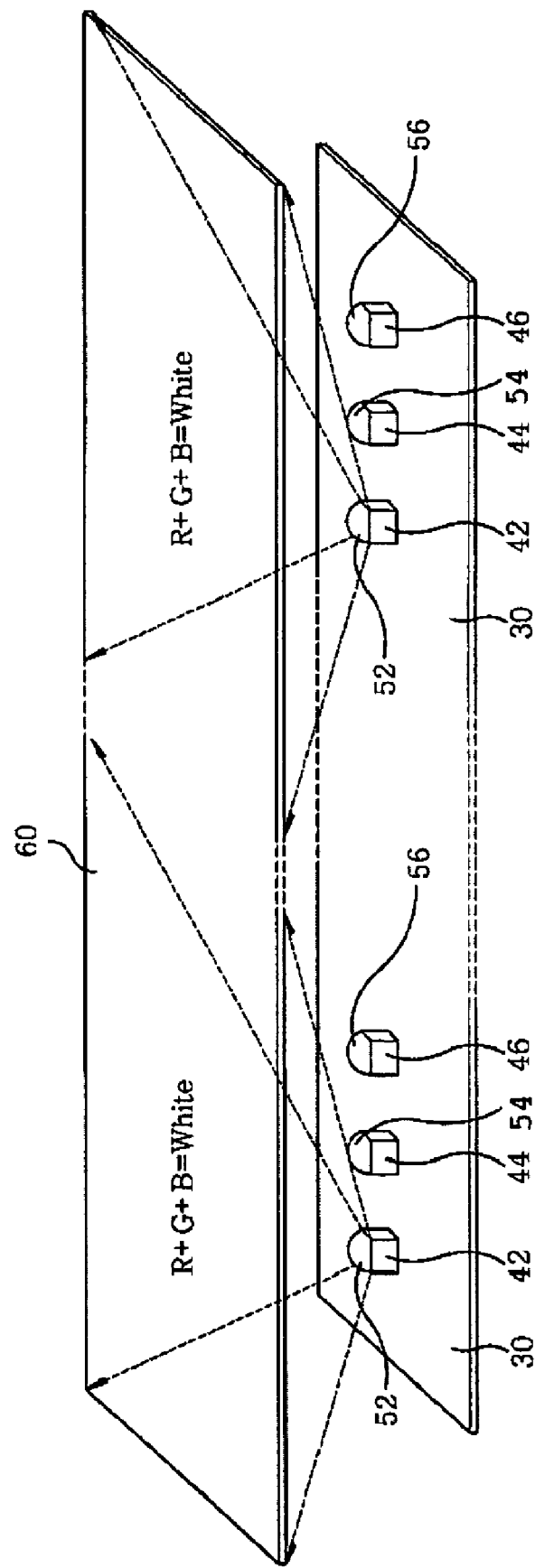

*FIG.6A*  *FIG.6B*
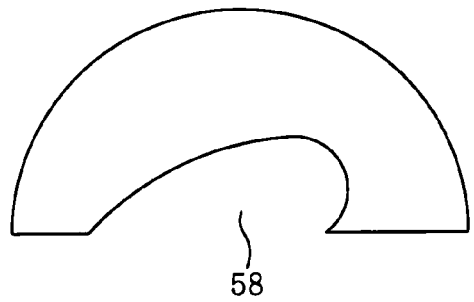
58
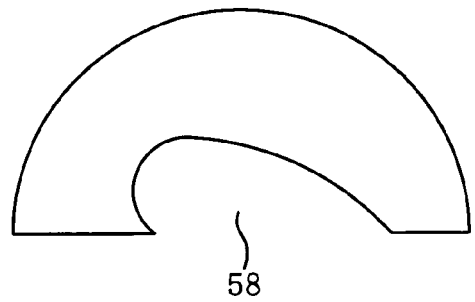
58
*FIG.6C*  *FIG.6D*
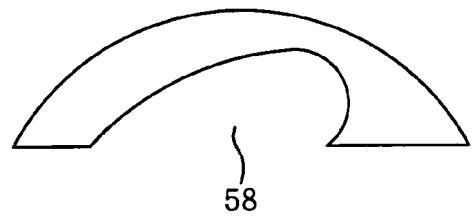
58
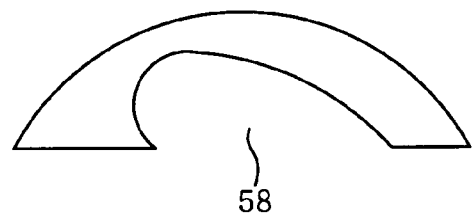
58
*FIG.6E*  *FIG.6F*
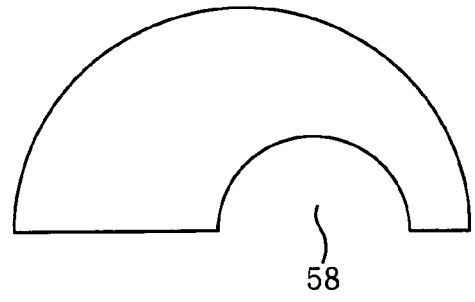
58
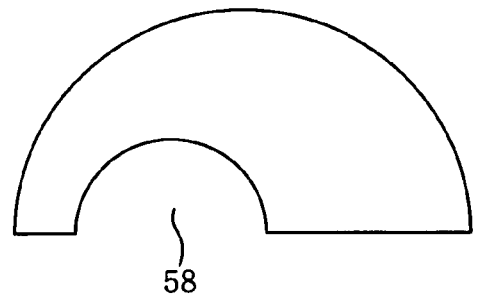
58
*FIG.6G*  *FIG.6H*
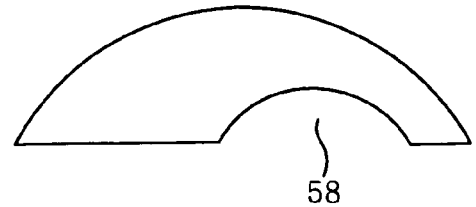
58
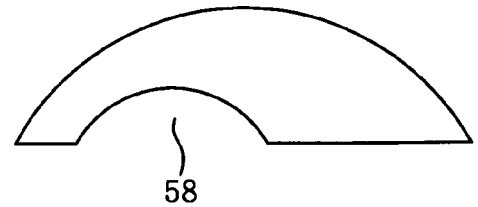
58

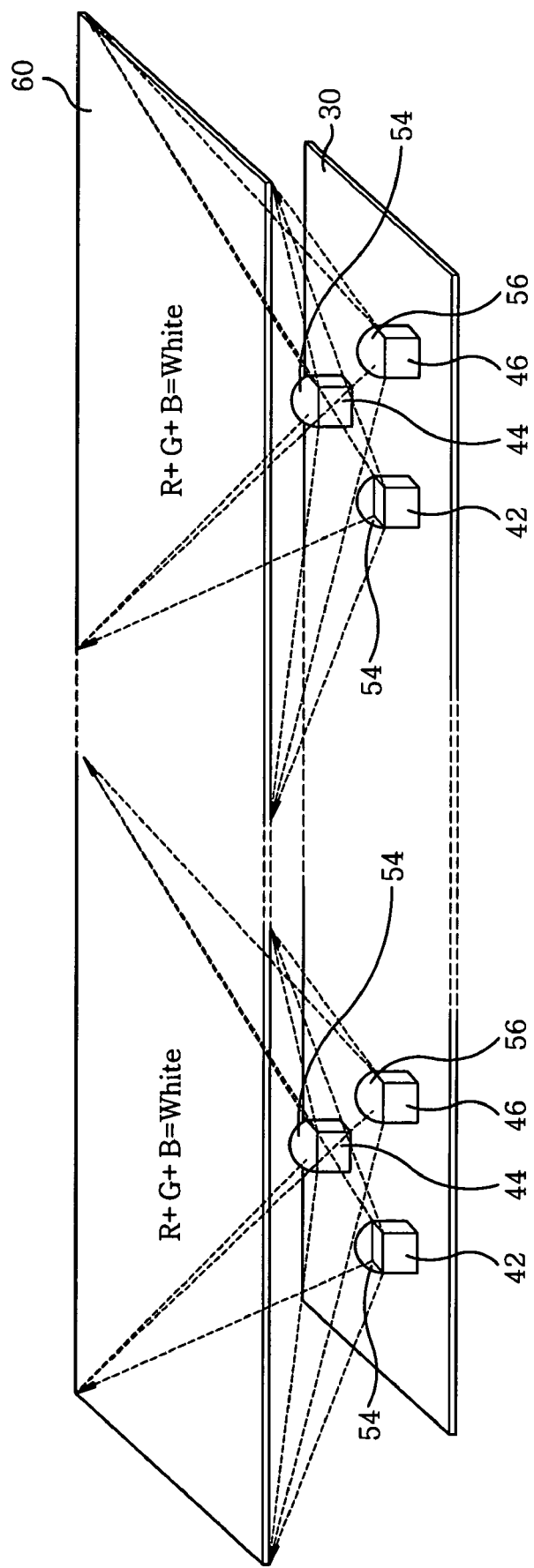

BACKLIGHT UNIT AND LIGHT SOURCE FOR USE IN SAME

FIELD OF THE INVENTION

The present invention relates to a backlight unit and a light emitting diode lens for use in the same, and more particularly, to a backlight unit capable of effectively mixing the lights emitted from red, green and blue light emitting diodes and a light emitting diode lens for use in such a backlight unit.

BACKGROUND OF THE INVENTION

A cathode ray tube ("CRT"), one of typical display devices, has been extensively used in television sets or computer monitors, but fails to catch up with the recent trend of miniaturization and lightweight of electronic equipments, due to the heavyweight nature and inherent bulkiness thereof.

Thus, a variety of technologies have been developed in an effort to replace the cathode ray tube with new display devices, examples of which include a liquid crystal display ("LCD") using an electric field optical effect, a plasma display panel ("PDP") using a plasma discharge and an electroluminescence display ("ELD") using an electric field light-emitting effect.

Among these devices, the liquid crystal display, which features thin lightweight configuration and low electricity operability, is showing rapid expansion in its range of applications with the improvement of liquid crystal materials and the development of fine pixel processing techniques, and is widely used in household television sets, desktop computer monitors, notebook computer monitors, large-sized flat panel television sets and so forth.

Most of the liquid crystal displays require the use of a separate backlight unit that serves as a light-flatting element for regulating the quantity of an incoming light to display images.

As shown in FIG. 1, a liquid crystal display module 1 for use in typical liquid crystal displays is comprised of a liquid crystal display panel 2 filled with liquid crystal, polarizing plates 4a and 4b for polarizing a light directed to the upper and lower surfaces of the liquid crystal display panel 2, a backlight unit 6 for supplying an uniform light to the liquid crystal display panel 2, a main support 8a for maintaining an external configuration of the liquid crystal display module 1, and a top case 8b.

Unlike the cathode ray tube or the plasma display panel, the liquid crystal display panel 2 does not emit any light by itself but merely changes orientation or arrangement of the liquid crystal. This makes it necessary to provide, at the rear of the liquid crystal display panel 2, the backlight unit 6 for evenly surface-irradiating the light on an information display surface.

In this regard, the backlight unit 6 is classified into an edge type and a direct type depending on the position of a light source. As illustrated in FIG. 2A, the edge type backlight unit includes a light source 12 disposed at one edge of a light guide plate 14 for surface-irradiating a light. In contrast, the direct type backlight unit is subdivided into a dot type wherein a plurality of dot-like light sources 16a are mounted on a substrate 30 as shown in FIG. 2B and a line type wherein a plurality of linear light sources 16b are mounted on a substrate 30 as shown in FIG. 2C. In such direct type backlight units, the light sources are substantially evenly distributed on the entire surface of the substrate.

Examples of the light source conventionally used include an electroluminescence ("EL") element, a cold cathode fluorescent lamp ("CCFL") and a hot cathode fluorescent lamp ("HCFL"). In recent years, extensive use is made of a light emitting diode ("LED") that has a broad area of color reproduction and is environmentally friendly.

Research has been made to develop methods of using the light emitting diode as a light source in the backlight unit. Subjects of the research include a method of taking advantage of a blue color light emitting diode and an yttrium aluminum garnet ("YAG") fluorescent body, a method of using an ultraviolet emitting diode in combination with fluorescent bodies of red, green and blue colors, and a method of employing red, green and blue light emitting diodes to admix the lights generated from them.

The method of taking advantage of a blue color light emitting diode and an yttrium aluminum garnet ("YAG") fluorescent body is disadvantageous in that the light source thus produced has a reduced ability to express the red color and a low light emitting efficiency. Likewise, the method of using an ultraviolet emitting diode in combination with fluorescent bodies of red, green and blue colors poses a drawback in that it is difficult to develop the fluorescent bodies, with the resultant light source exhibiting a deteriorated thermal characteristic.

The method of employing red, green and blue light emitting diodes is effective in designing the light source to have a broadened range of color reproduction, thank to the increased intensity of red, green and blue lights emitted from the respective light emitting diodes. However, the method has a problem in that it is difficult to compose a combination of diodes for a white surface light source.

In the meantime, along with the recent trend of pursuing a large-sized and high image quality display device, a demand has existed for a liquid crystal display capable of driving a screen by a local dimming method and a field sequential method. Further, in order to assure an improved color reproduction characteristic, attention is being paid on a method wherein light emitting diodes of red, green and blue colors are used independently and a white color light is obtained by mixing the lights of the respective light emitting diodes.

Moreover, with a view to meet the requirements of high luminance and increased color temperature, there have been developed lenses for collecting the lights emitted from light emitting diodes, semiconductor chips and diode materials.

In particular, a molding technique has been developed that includes the steps of mounting light emitting diodes on the top surface of a substrate having thin film patterns, forming a molded portion on the light emitting diodes through the use of epoxy, acryl or silicon resin, and placing a lens on the surface of the molded portion to increase the luminance. In recent years, development is focused on a high flux lens in which a lens is integrally formed with a molded portion.

Taking an example, U.S. Patent Publication No. 2002/0190262 discloses a light emitting device including a resin portion with an opening, a first semiconductor light emitting element and a semiconductor device disposed inside the opening of the resin portion, and a silicon resin provided in the opening to cover the first semiconductor light emitting element and the semiconductor device, wherein the opening has a shape close to an ellipse or a circle, thus forming a lens.

However, such a lens lacks an ability to compensate the difference in luminous flux that varies with the positions of red, green and blue light emitting diodes mounted on a printed circuit board, which makes it impossible to obtain a homogeneous white light. An increasing number of light emitting diodes should be employed as a liquid crystal display grows in its size, in which case it becomes even more difficult to mix the lights into a homogeneous white light.

As a solution to this problem, it has been conventionally proposed to collect the lights emitted from the respective light emitting diodes or to diffuse the lights in the form of side light emission. However, these solutions also fail to obtain a homogeneous white light due to the lack of consideration of the difference in characteristic depending on the positions of the respective light emitting diodes.

Further, in order for a backlight unit to employ, e.g., a local dimming technique that will be put in use in the future to make a selected part of a liquid crystal display screen visible to a user, it must be possible to selectively turn on or off a desired partial region of the total irradiation area. However, the conventional lens method and the light collecting method have a technical limit in conducting the task of turning on or off the partial region of a screen.

SUMMARY OF THE INVENTION

It is, therefore, an object of the present invention to provide a backlight unit that can allow lights emitted from a plurality of light emitting diodes arranged in the backlight unit to direct in a predetermined direction by regulating the light irradiation angles of individual light emitting diodes, thus making it possible to produce a homogeneous white light, and a light source for use in such a backlight unit.

Another object of the present invention is to provide a backlight unit that can allow a plurality of light emitting diodes to irradiate lights asymmetrically on an elliptical area close to a rectangle, thus making it possible to perform a local dimming operation, and a light emitting diode lens for use in such a backlight unit.

In accordance with one aspect of the present invention, there is provided a backlight unit, which includes: a substrate; a plurality of light emitting diodes arranged on the substrate in a spaced-apart relationship with one another for emitting lights; and a plurality of lenses coupled to the light emitting diodes for irradiating the lights emitted from the light emitting diodes toward a predetermined target region, wherein each of the lenses has an asymmetrical irradiation characteristic such that the lenses allow the lights to be uniformly mixed with each other, to thereby create a white light.

In accordance with another aspect of the present invention, there is provided a light source for use in a backlight unit, which includes: a set of light emitting diodes for emitting red, green and blue lights; and a set of lenses coupled to the light emitting diodes for directing the lights emitted from the light emitting diodes in a predetermined direction, wherein each of the lenses has an asymmetrical irradiation characteristic such that the lenses allow the lights to be uniformly mixed with each other so as to create a white light, and wherein the lights through the lenses are irradiated in an elliptical shape close to a rectangle toward a top portion of the backlight unit.

According to the present invention, the backlight unit allows the lenses coupled to the light emitting diodes, disposed at corners of a polygon or arranged side by side, to irradiate lights asymmetrically on an elliptical area close to a rectangle, thus making it possible to readily perform a local dimming operation in, e.g., color filter-free liquid crystal display devices, while creating a homogeneous white light through the irradiation of red, green and blue lights on the same region of a diffusion plate.

BRIEF DESCRIPTION OF THE DRAWINGS

The above and other objects and features of the present invention will become apparent from the following description of preferred embodiments, given in conjunction with the accompanying drawings, in which:

FIG. 4 is a perspective view of the backlight unit shown in FIG. 3, with the light emitting diodes arranged side by side;

FIGS. 6A to 6H are front elevational views showing various lenses in accordance with one embodiment of the present invention;

FIG. 9 is a perspective view of the backlight unit shown in FIG. 3, with the light emitting diodes disposed at corners of a triangle;

DETAILED DESCRIPTION OF THE PREFERRED EMBODIMENTS

Hereinafter, preferred embodiments of the present invention will be described in detail with reference to the accompanying drawings.

Figure 1:
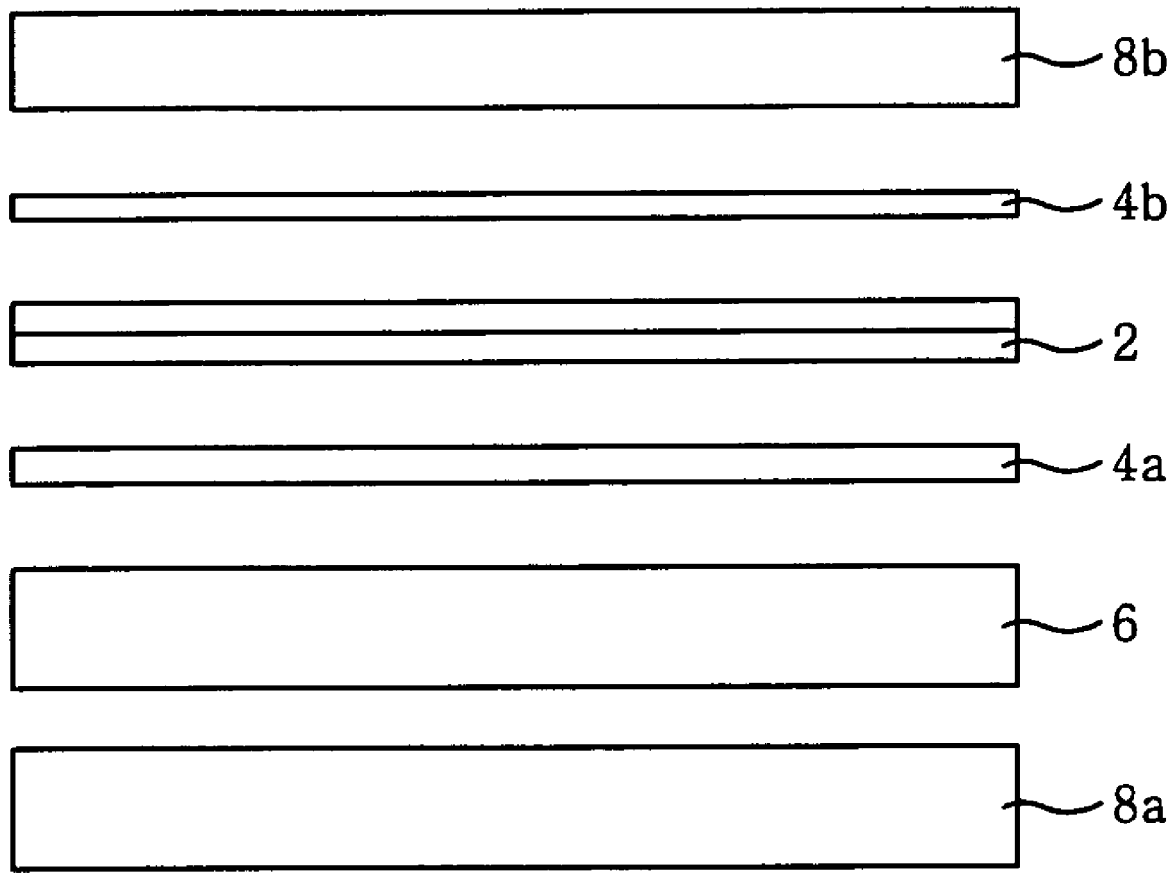
FIG. 1 shows an exemplary configuration of a prior art liquid crystal display module.
Figure 2A:
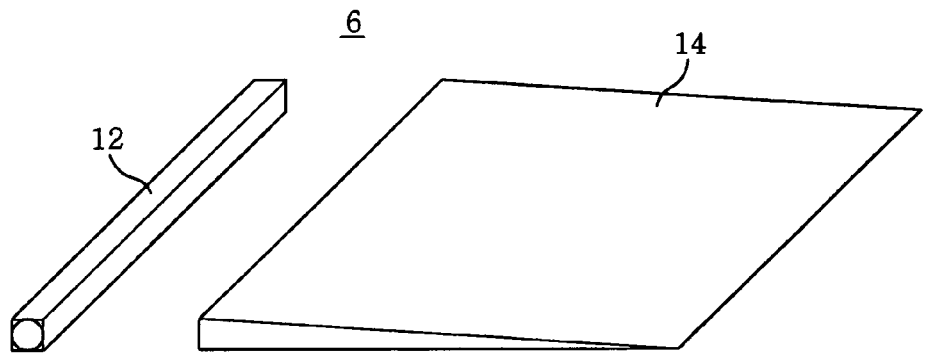
FIGS. 2A to 2C are perspective views illustrating some kinds of typical backlight units.
Figure 2B:
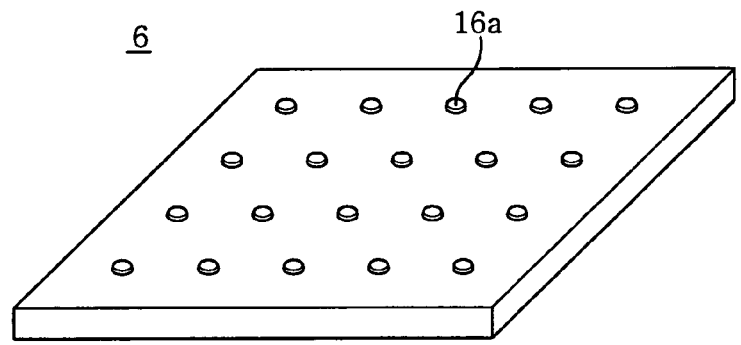
Figure 2C:
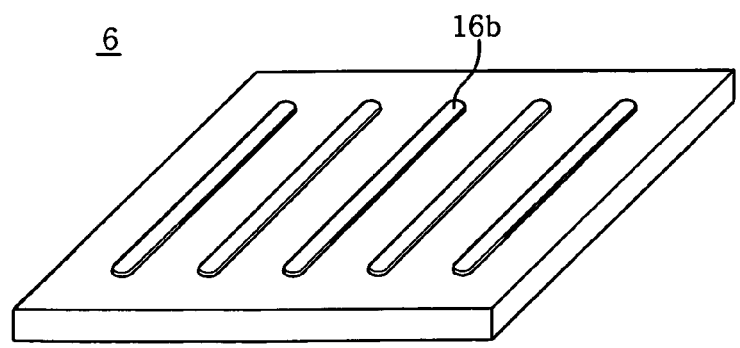
Figure 3:
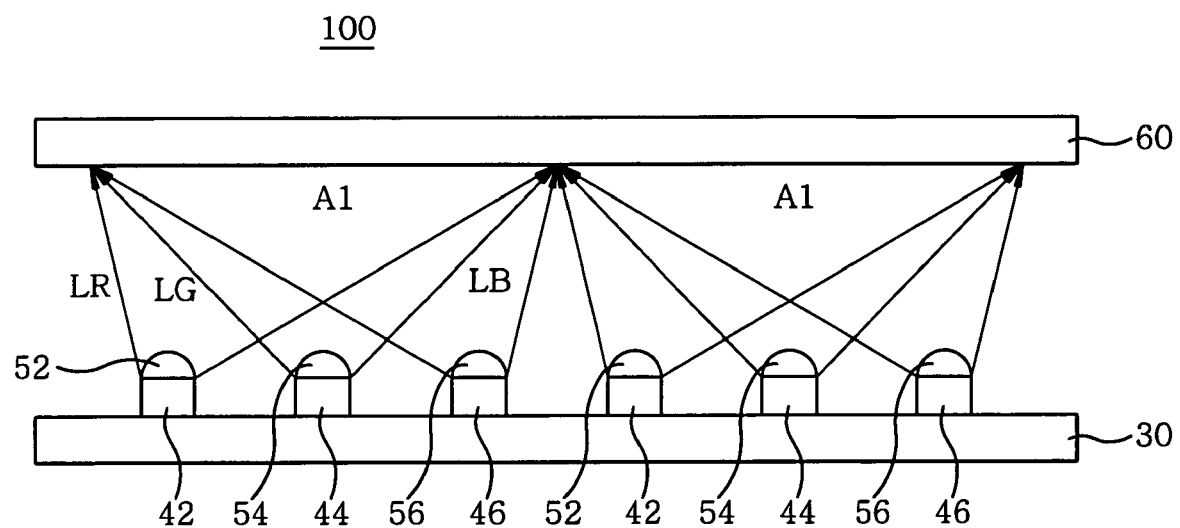
FIG. 3 is a front elevational view depicting the light irradiation angles of red, green and blue light emitting diodes disposed at corners of a triangle or arranged side by side, in a backlight unit in accordance with one embodiment of the present invention.
Figure 7A:
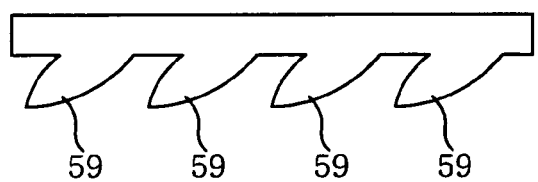
FIGS. 7A and 7B are front elevational views showing lenses in accordance with another embodiment of the present invention.
Figure 7B:
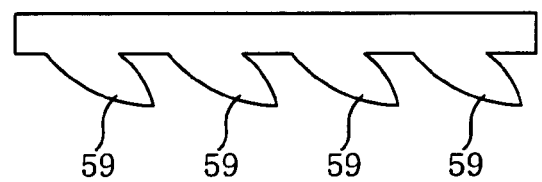
Figure 8A:
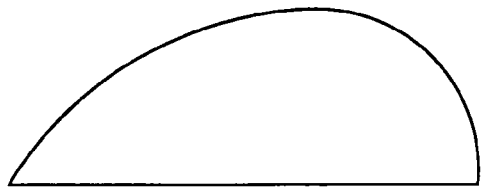
FIGS. 8A and 8B are front elevational views showing lenses in accordance with a further embodiment of the present invention.
Figure 8B:
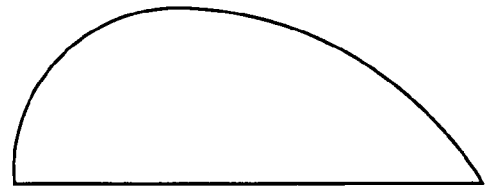

FIG. 3 depicts the light irradiation angles of red, green and blue light emitting diodes disposed in a backlight unit in accordance with one embodiment of the present invention. FIGS. 4 and 5 show the light irradiation angles of the light emitting diodes when they are arranged side by side. FIGS. 6 to 8 are front elevational views showing lenses in accordance with certain embodiments of the present invention. FIGS. 9 and 10 show the light irradiation angles of the light emitting diodes when they are disposed at corners of a triangle.

As shown in FIG. 3, a backlight unit 100 in accordance with the present invention includes a substrate 30 on which a circuit pattern (not shown) is formed, a plurality of light emitting diodes 42, 44 and 46 arranged on the substrate 30 in a spaced-apart relationship with one another (two groups of three diodes shown in FIG. 3 merely for the illustrative purpose), a diffusion plate 60 disposed above the light emitting diodes 42, 44 and 46, and a plurality of lenses 52, 54 and 56 each coupled to the light emitting diodes 42, 44 and 46 in a one-to-one relationship for irradiating the red, green and blue lights emitted from the light emitting diodes 42, 44 and 46 on the diffusion plate 60.

The substrate 30 serves to support the light emitting diodes 42, 44 and 46, and to dissipate the heat generated by the light emitting diodes 42, 44 and 46 to the outside.

Two groups of the light emitting diodes 42, 44 and 46 are mounted on the substrate 30 at a generally equal spacing. Each group of the light emitting diodes 42, 44 and 46 is comprised of a red light emitting diode 42, a green light emitting diode 44 and a blue light emitting diode 46. The lenses 52, 54 and 56 are coupled to the corresponding one of the light emitting diodes 42, 44 and 46, respectively. The lenses 52, 54 and 56 act to collect or diffuse the lights emitted from the light emitting diodes 42, 44 and 46 and have different shapes depending on the light collection or diffusion characteristics thereof.

The lenses 52, 54 and 56 are usually of a circular shape but may have a rectangular plate shape. Furthermore, the lenses 52, 54 and 56 are designed into a spherical or aspherical shape such that they can control the quantity of the lights emitted vertically upwardly from the light emitting diodes 42, 44 and 46, thus avoiding any occurrence of hot spots.

Figure 12:
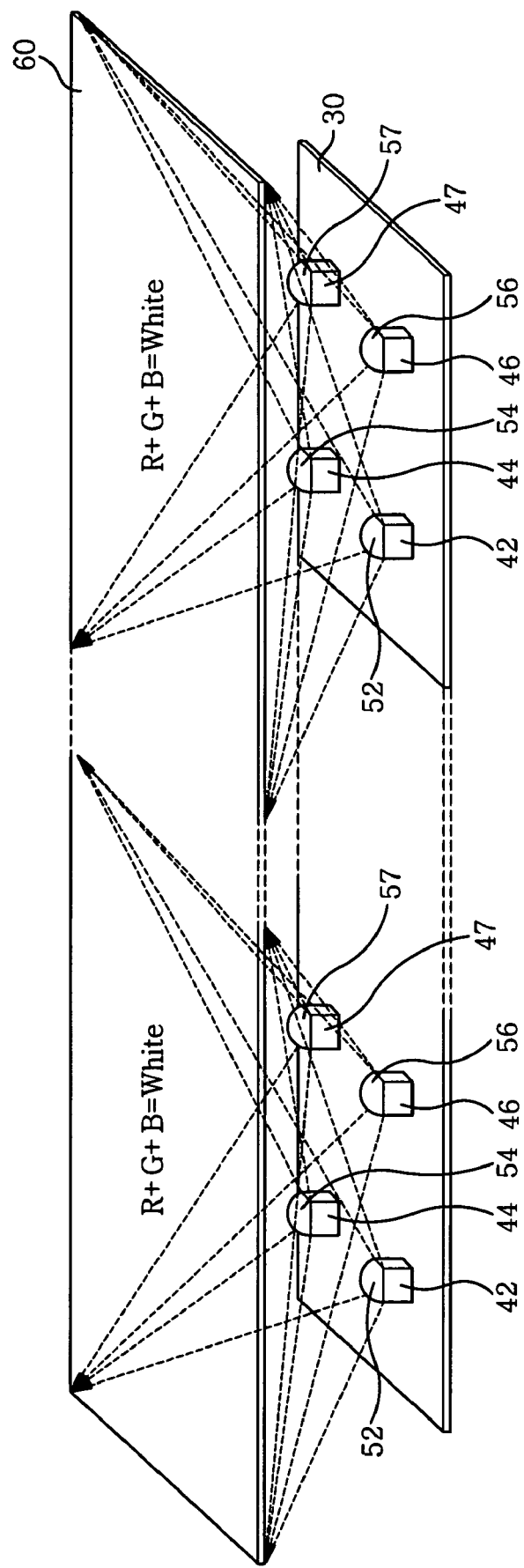
FIG. 12 is a perspective view of the backlight unit shown in FIG. 11.

In this regard, it is preferred that the light emitting diodes 42, 44 and 46 are arranged side by side at an equal interval as illustrated in FIG. 4 or disposed at corners of a polygon, e.g., a triangle (see FIG. 9) or a rectangle (see FIG. 12).

The red light LR, the green light LG and the blue light LB respectively emitted from the red, green and blue light emitting diodes 42, 44 and 46 are irradiated on one and the same target region A1 where the red light LR, the green light LG and the blue light LB are mixed with each other to create a white light.

Although the red light LR, the green light LG and the blue light LB should preferably be irradiated on one and the same target region A1 as can be seen in FIG. 3, they may be irradiated on regions slightly deviated from one another. Even though the light-irradiated regions somewhat differ from one another, there is no problem in creating the white light, because the lights of the light emitting diodes 42, 44 and 46 are to be overlapped in their most parts.

Figure 5A:
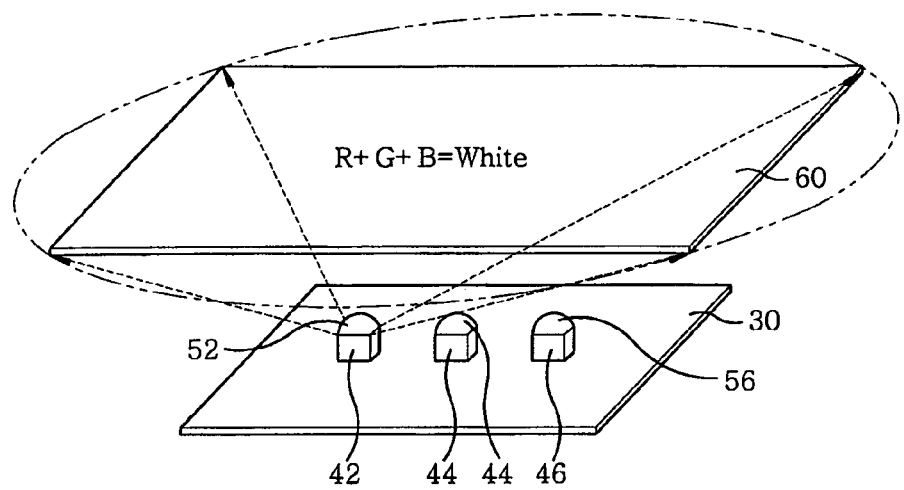
FIGS. 5A to 5C illustrate the light irradiation angles of individual light emitting diodes as shown in FIG. 4.
Figure 5B:
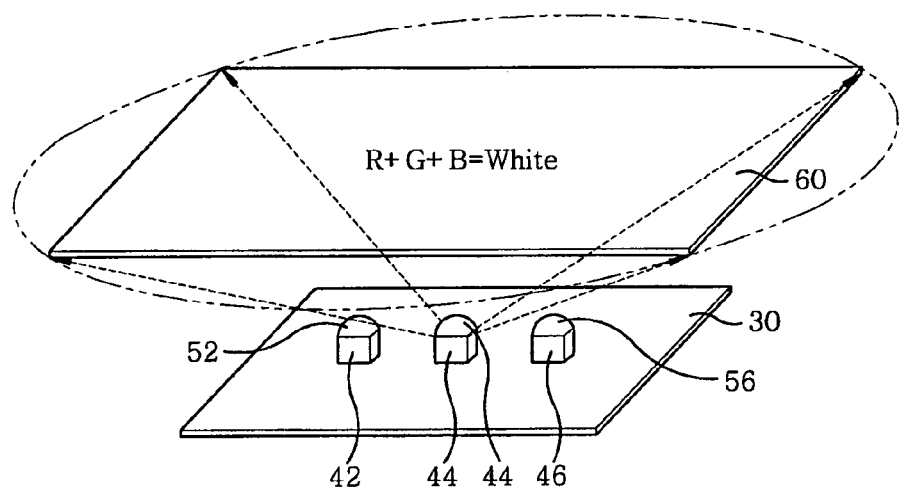
Figure 5C:
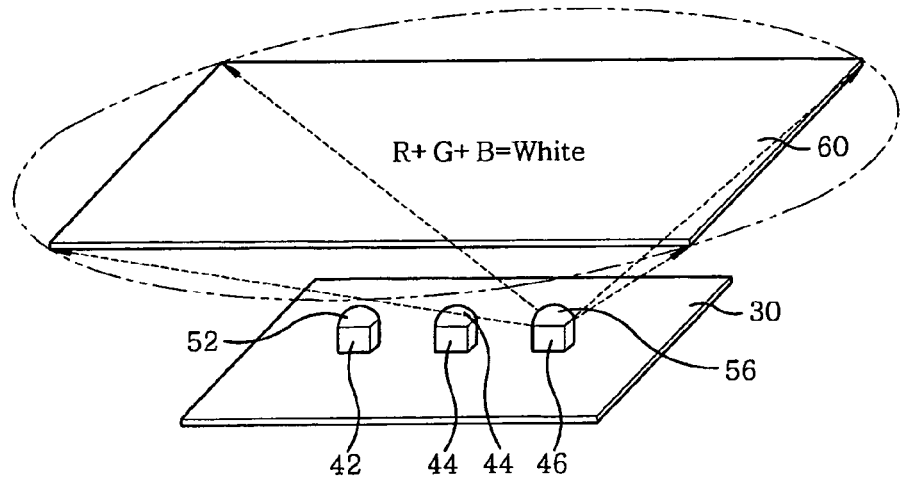

In order to assure that the red, green and blue lights are irradiated on the target region A1, the lens 52 for the red light emitting diode 42 is angled rightwards to deflect the red light LR toward the target region A1 of the diffusion plate 60 as illustrated in FIG. 5A. The lens 54 for the green light emitting diode 44 remains exactly upright to irradiate the green light LG toward the target region A1 of the diffusion plate 60 as illustrated in FIG. 5B. The lens 56 for the blue light emitting diode 46 is angled leftwards to deflect the blue light LB toward the target region A1 of the diffusion plate 60 as illustrated in FIG. 5C. Thus, a white light is created at the target region A1 and then projected upward through the diffusion plate 60.

In other words, depending on the arrangement of the red, green and blue light emitting diodes 42, 44 and 46, the irradiation angles of the red, green and blue lights LR, LG and LG should be properly adjusted to create the white light at the target region A1.

As shown in FIGS. 6A to 6H, therefore, according to the present invention, an asymmetrical recess 58 is formed on the surface of each of the lenses 52, 54 and 56 making contact with the light emitting diodes 42, 44 and 46, to thereby ensure that the irradiation angles of the lights emitted from the light emitting diodes 42, 44 and 46 can be asymmetrically deflected in vertical or horizontal direction. Each of the lenses 52, 54 and 56 has an asymmetrical irradiation characteristic, which allows the lights to be uniformly mixed with each other so as to create a white light, and the lights through the lenses to be irradiated in an elliptical shape close to a rectangle toward a top portion of the backlight unit.

Although each of the lenses 52, 54 and 56 is shown to have a single asymmetrical recess 58, two or more of the asymmetrical recess 58 may be formed on the respective lenses 52, 54 and 56, if desired.

Further, as shown in FIG. 7, the lenses 52, 54 and 56 may be generally planar and may have a plurality of angled protrusions 59 on the surface making contact with the light emitting diodes 42, 44 and 46, to thereby ensure that the irradiation angles of the lights emitted from the light emitting diodes 42, 44 and 46 can be deflected in vertical or horizontal direction. Such an asymmetrical irradiation characteristic enables the lights to be irradiated in an elliptical shape close to a rectangle toward a top portion of the backlight unit. Similarly, as shown in FIG. 8, it is possible to asymmetrically deflect the irradiation angles of the lights emitted from the light emitting diodes 42, 44 and 46 in vertical or horizontal direction by changing the gradient of convex top surfaces of the lenses 52, 54 and 56, respectively. The asymmetrical irradiation characteristic enables the lights to be irradiated in an elliptical shape close to a rectangle toward a top portion of the backlight unit.

Alternatively, although not shown in the drawings, a plurality of angled protrusions may be formed on spherical or aspherical lenses and, likewise, an asymmetrical recess may be formed on planar lenses.

The lenses 52, 54 and 56 are made of high molecular materials such as glass, quartz, epoxy resin, silicon resin, polymethyl-methacrylate (PMMA) and the like. A fluorescent material may be uniformly dispersed in the lenses 52, 54 and 56 to change the color of the lights emitted from the light emitting diodes 42, 44 and 46.

Figure 10A:
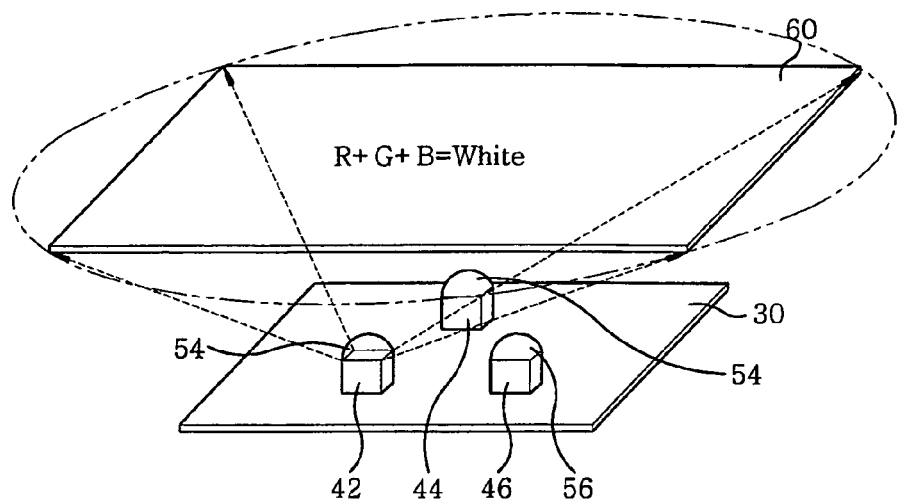
FIGS. 10A to 10C illustrate the light irradiation angles of individual light emitting diodes as shown in FIG. 9.
Figure 10B:
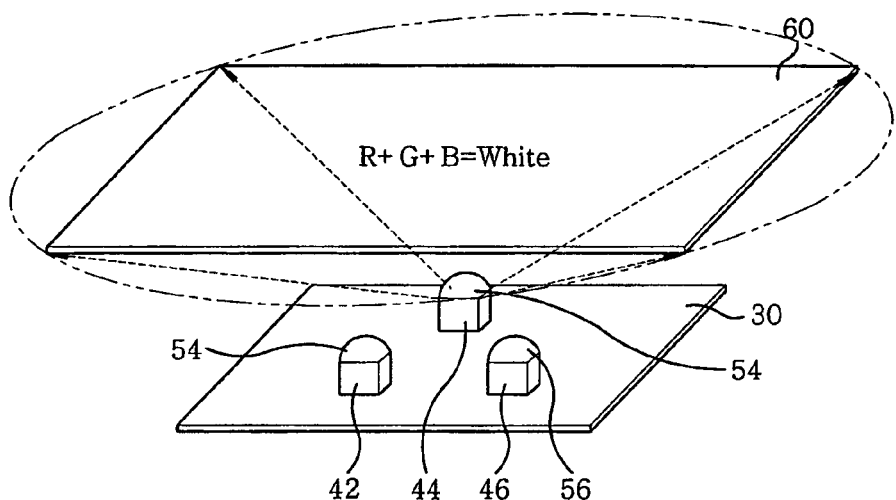
Figure 10C:
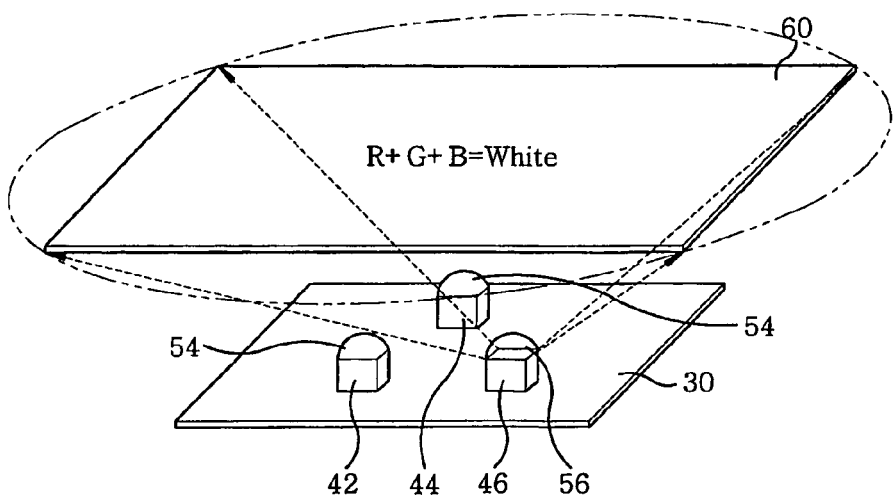

In the event that the light emitting diodes 42, 44 and 46 are disposed at corners of a triangle as shown in FIGS. 3, 9 and 10A to 10C, the leftmost lens 52 for the red light emitting diode 42 is angled rightwards to deflect the red light LR toward the target region A1 of the diffusion plate 60 as illustrated in FIG. 10A. Similarly, the rear and rightmost lenses 54 and 56 are angled so as to deflect the green and blue lights LG and LB toward the target region A1 of the diffusion plate 60 as illustrated in FIGS. 10B and 10C. Thus, a white light is created at the target region A1 and then projected upward through the diffusion plate 60.

Figure 11:
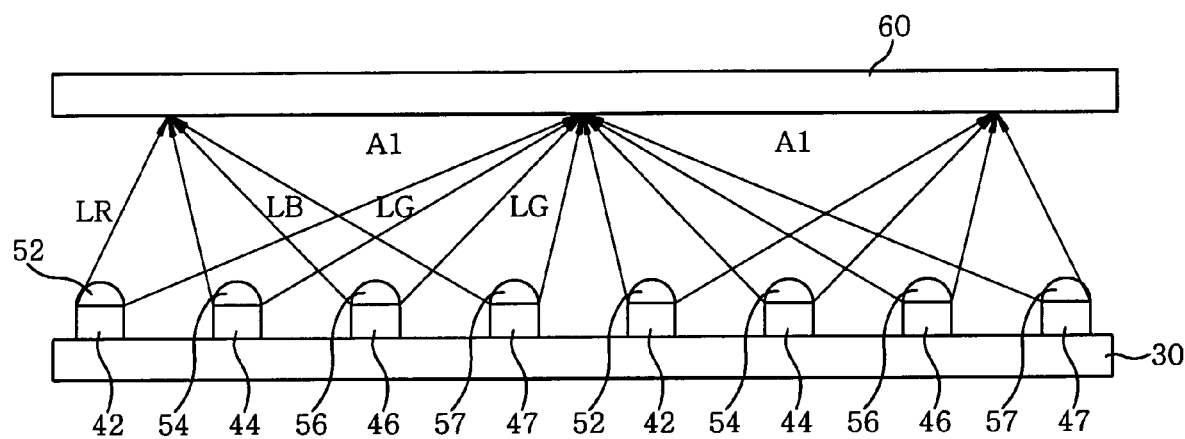
FIG. 11 is a front elevational view depicting the light irradiation angles of red, green, blue and green light emitting diodes disposed at corners of a rectangle, in a backlight unit in accordance with another embodiment of the present invention.

FIGS. 11 and 12 depict the light irradiation angles of four, e.g., red, green, blue and green light emitting diodes disposed at corners of a rectangle, in a backlight unit in accordance with another embodiment of the present invention. FIGS. 13A to 13D illustrate the light irradiation angles of individual light emitting diodes.

Figure 13A:
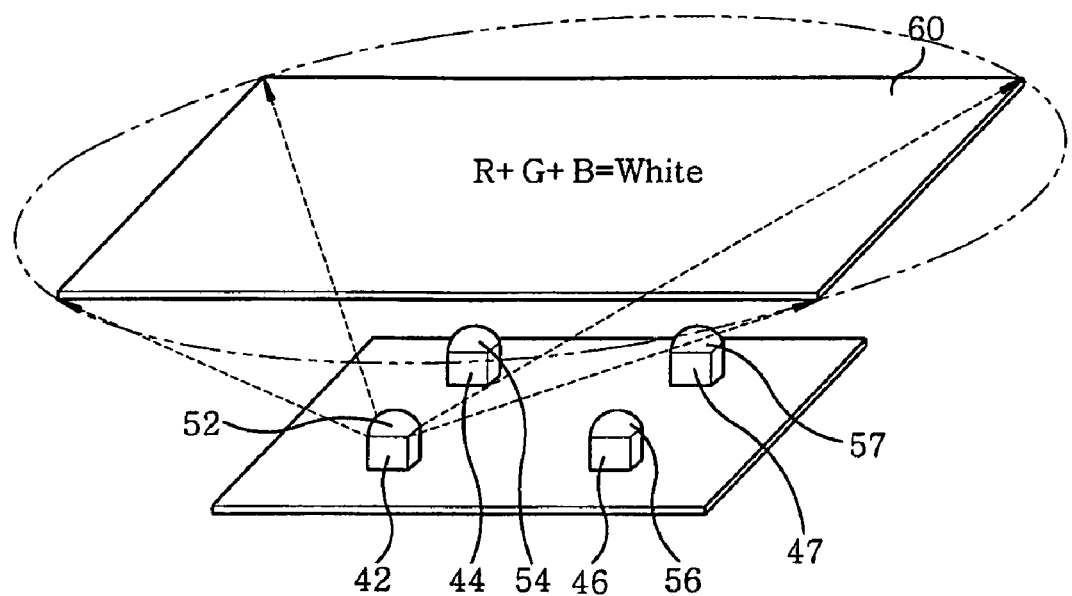
FIGS. 13A to 13D illustrate the light irradiation angles of individual light emitting diodes as shown in FIG. 12.
Figure 13B:
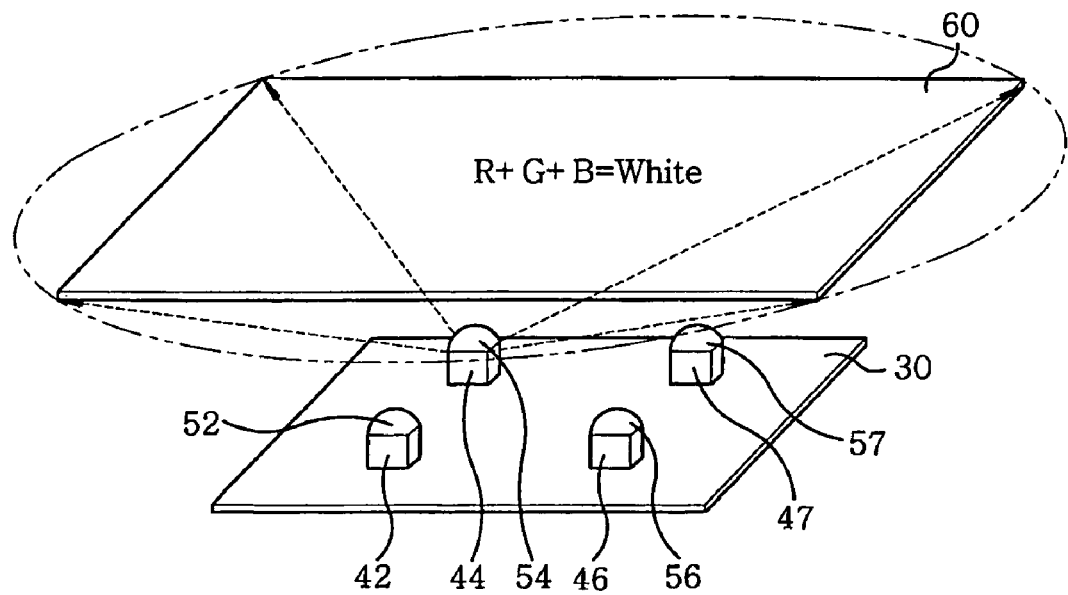
Figure 13C:
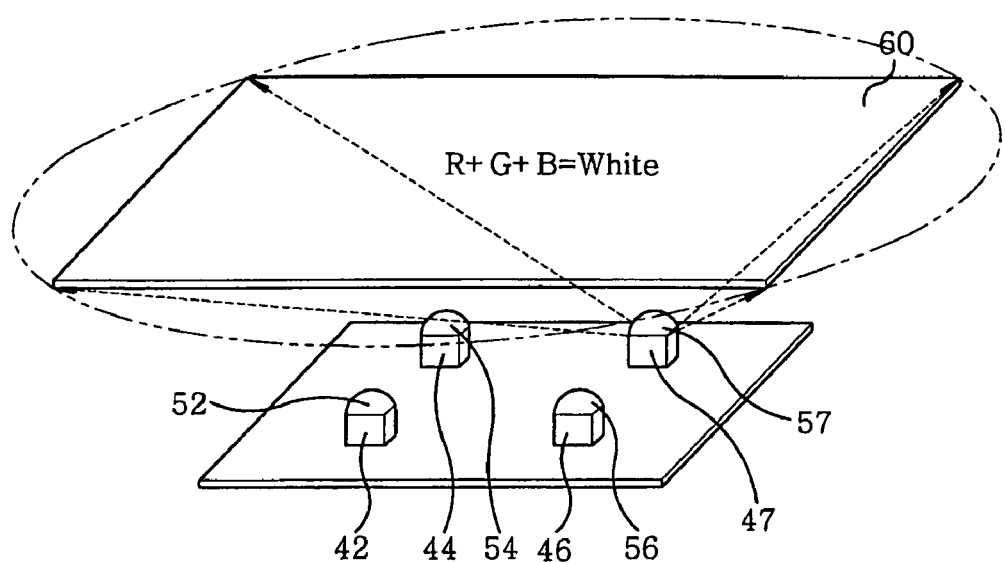
Figure 13D:
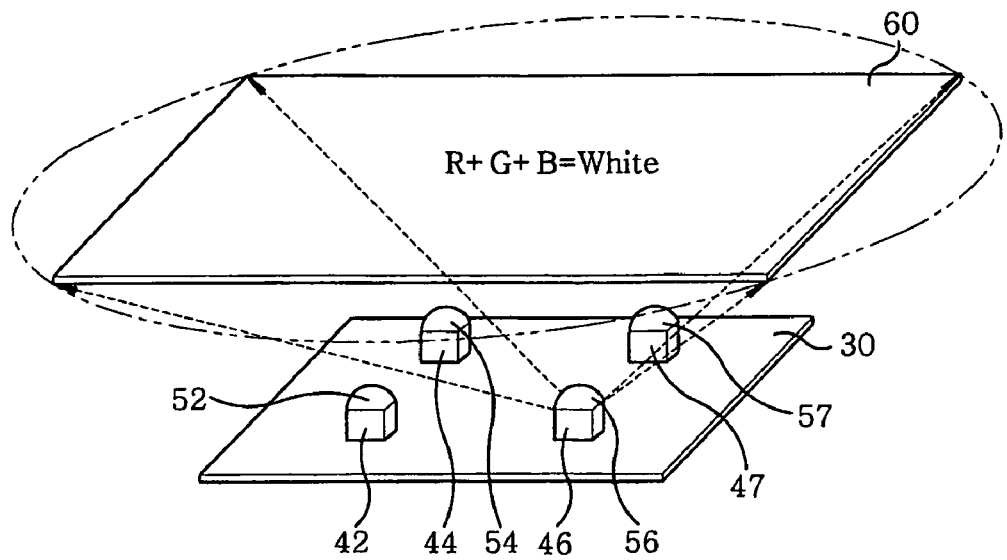

Referring to FIG. 13A, the frontal left lens 52 for the red light emitting diode 42 is angled rightwards and rearwards to deflect the red light LR toward the target region A1 of the diffusion plate 60. Similarly, as shown in FIGS. 13B, 13C and 13D, the rear left, rear right and frontal right lenses 54, 56 and 57 are angled so as to deflect the green, green and blue lights LG, LG and LB toward the target region A1 of the diffusion plate 60. Thus, a white light is created at the target region A1 and then projected upward through the diffusion plate 60.

Figure 14A:
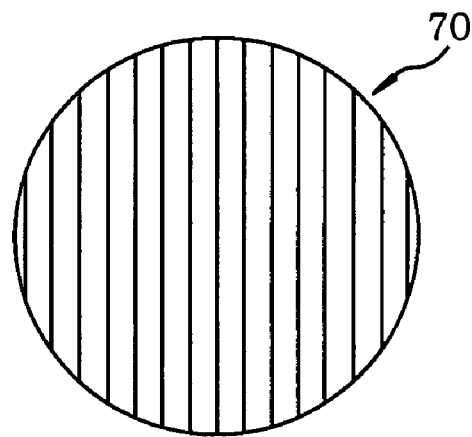
FIGS. 14A and 14B are plan and front elevational views showing a lens that exhibits an elliptical irradiation characteristic.
Figure 14B:
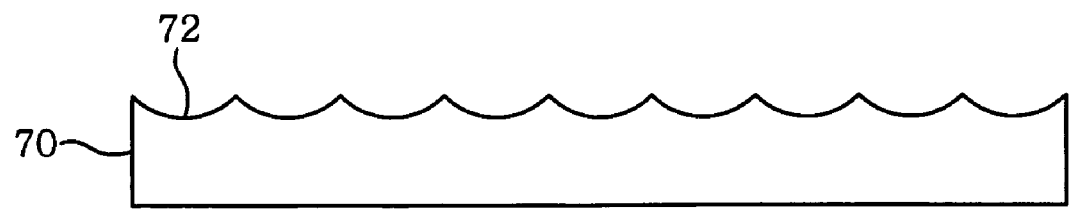

FIGS. 14A and 14B show a lens that exhibits an elliptical irradiation characteristic rather than a circular one. The elliptical irradiation lens 70 has a planar shape and is provided with a plurality of parallel grooves 72 extending in one direction. This makes it possible for the lens 70 to change the direction of irradiation of the light irradiated therefrom.

Figure 15:
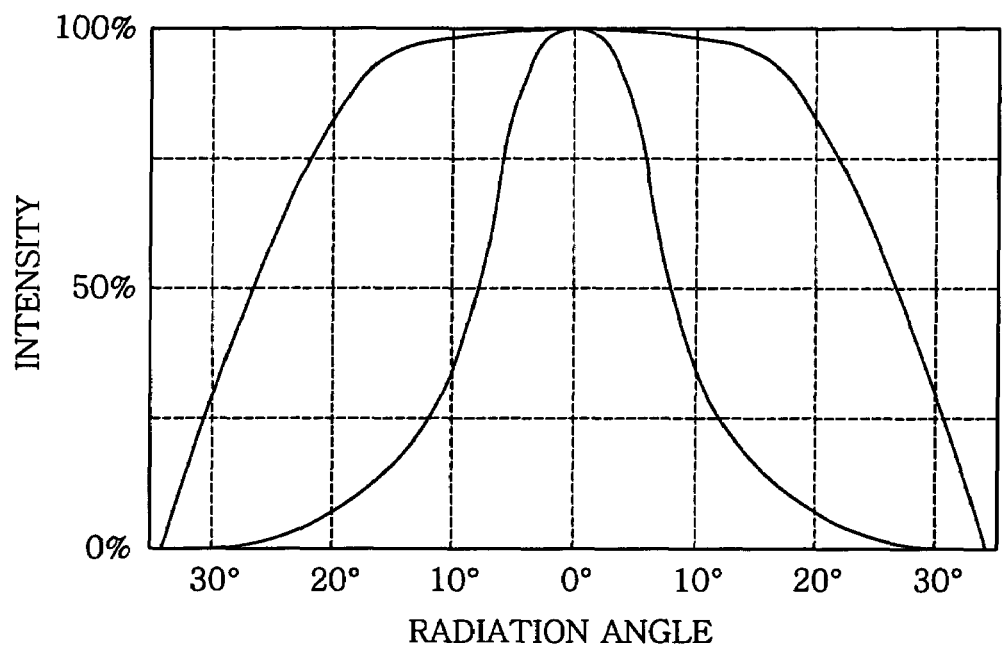
FIG. 15 is a graph representing an irradiation characteristic of the lens shown in FIG. 14.

FIG. 15 graphically represents the irradiation characteristic of the lens 70. Use of the grooved planar lens 70 makes it possible to asymmetrically deflect the lights, which constitutes one of major features of the present invention. As an alternative, the elliptical directivity can be obtained through the use of a grooved convex lens not shown in the drawings.

Figure 16:
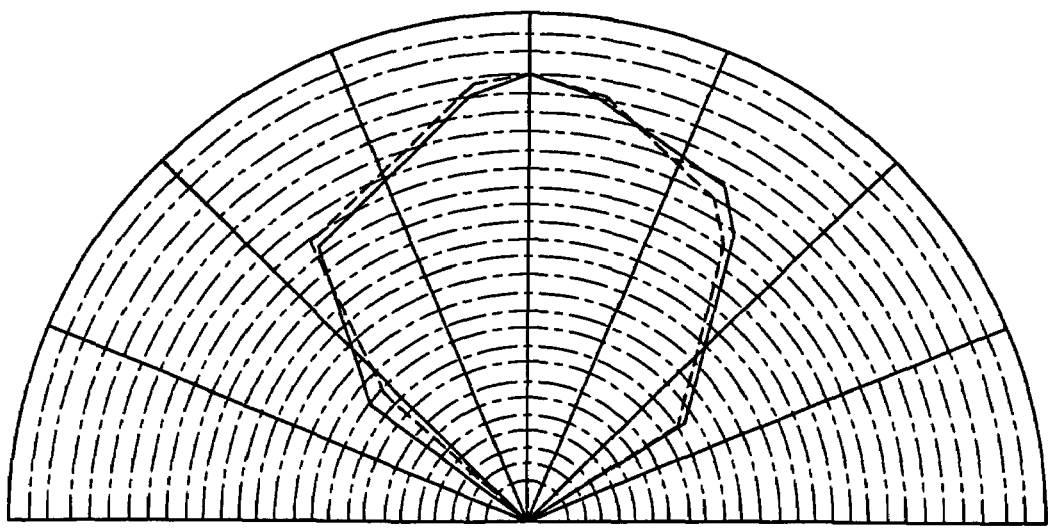
FIG. 16 is a graph representing a directional characteristic of a light emitting diode with no lens.
Figure 17:
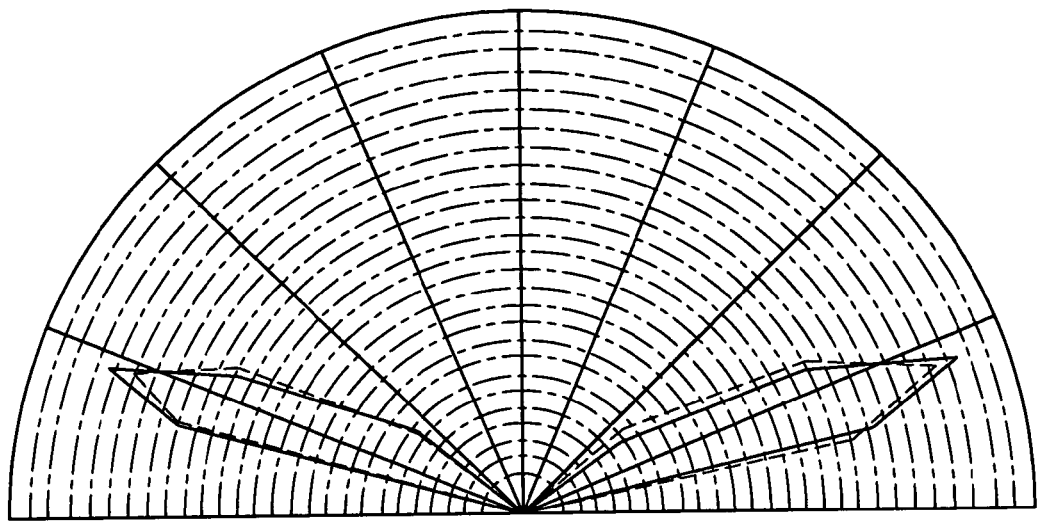
FIG. 17 is a graph representing a directional characteristic of a light emitting diode when a typical side emitter type lens is combined with the light emitting diode.
Figure 18:
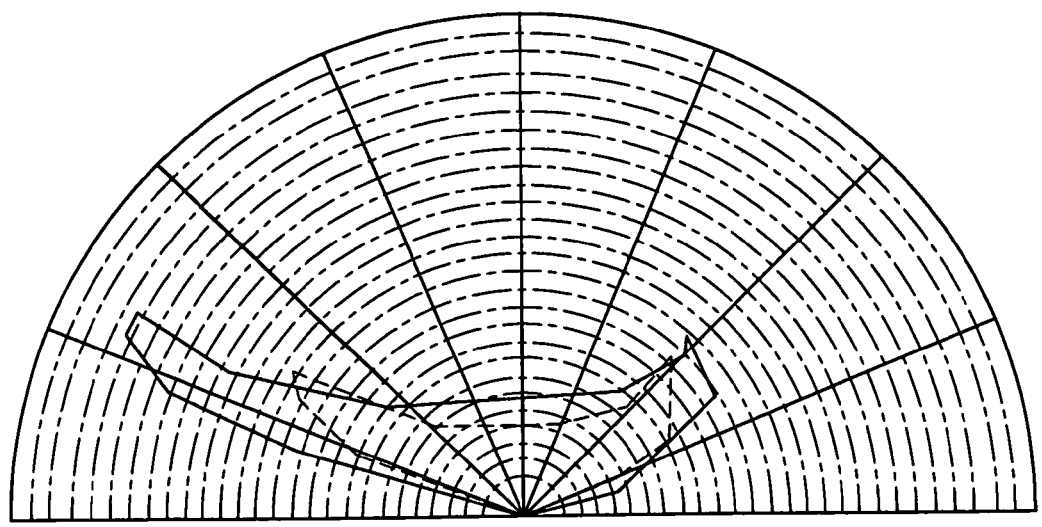
FIG. 18 is a graph representing a directional characteristic of a light emitting diode when a lens of the present invention is combined with the light emitting diode.

FIGS. 16, 17 and 18 graphically represents the directional characteristics of a light emitting diode with no lens, a light emitting diode having a typical side emitter type lens, and a light emitting diode provided with a lens of the present invention, respectively. In FIGS. 16 through 18, the solid lines denote a vertical directional characteristic of the light emitting diodes, while the dotted lines means a horizontal directional characteristic of the light emitting diodes.

It can be seen in FIG. 16 that, in case of the light emitting diode with no lens, the lights exhibit a so-called Lambersian directivity and therefore are uniformly distributed without being spread out in a particular direction. In case of the combination of a light emitting diode and a typical side emitter type lens, the lights are reduced at the central area and are spread out in a transverse direction as shown in FIG. 17. In case of a light emitting diode with a lens of the present invention, the lights show an asymmetrical directivity as illustrated in FIG. 18. In order for the lights to be irradiated on a generally rectangular region, the vertical directivity and the horizontal directivity should differ from each other as in FIG. 18, unlike in FIGS. 16 and 17 wherein the vertical directivity and the horizontal directivity are substantially the same. In this connection, it is understood that the asymmetrical directivity can be observed differently depending on a reference point or a position of an observer.

Figure 19A:
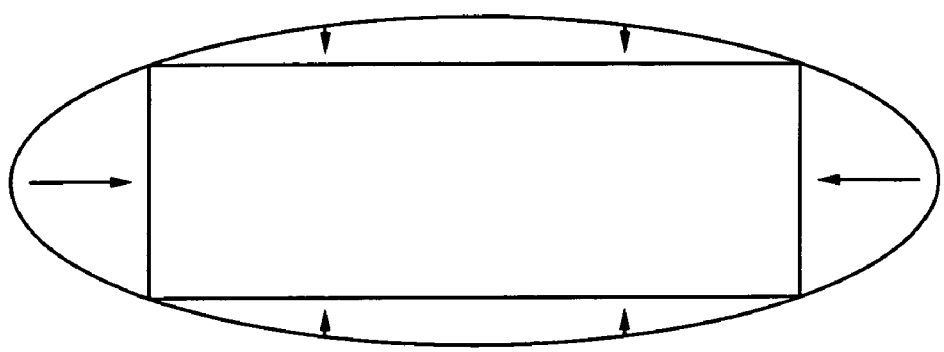
FIGS. 19A and 19B are schematic diagrams illustrating measurements of changing an elliptical irradiation pattern to a generally rectangular irradiation pattern.
Figure 19B:
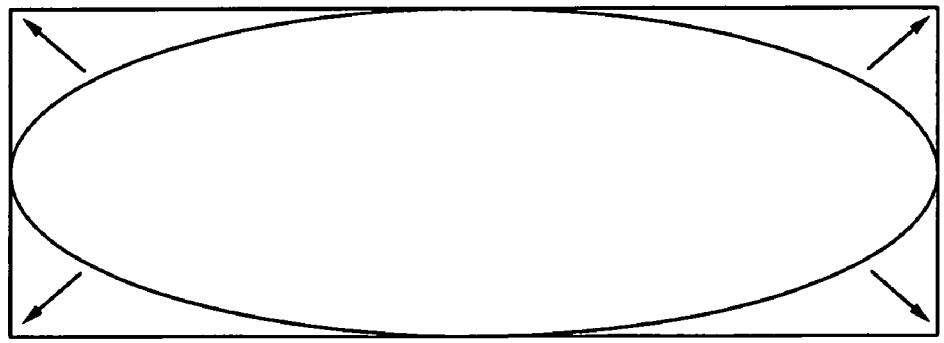

FIGS. 19A and 19B are schematic diagrams illustrating methods of changing an elliptical irradiation pattern to a generally rectangular irradiation pattern. Referring to FIG. 19A, the lights of left, right, top and bottom regions in an ellipse circumscribing a rectangle are gathered to irradiate the lights in a generally rectangular pattern. Turning to FIG. 19B, the lights of four corner regions outside an ellipse inscribing a rectangle are spread out to irradiate the lights in a generally rectangular pattern. Use of a properly designed lens can implement such change of the light irradiation pattern.

Actual examples of the backlight unit in accordance with the present invention and the lens for use in the same will now be described.

Light emitting diodes of red, green and blue colors having an output power 1 W were prepared, the center wavelength of which is 627 nm in the red light emitting diode, 530 nm in the green light emitting diode, and 455 nm in the blue light emitting diode. Each of the light emitting diodes is of the type whose center wavelength varies within 5% depending on the driving current and the thermal characteristic. The driving current of the light emitting diodes is 200 mA.

The light emitting diodes thus prepared were grouped into a plurality of diode sets. The red, green and blue light emitting diodes of each of the diode sets were mounted at corners of a triangle on a substrate.

Lenses were prepared using a silicon resin. Some of the lenses are designed into an aspherical shape. The lenses thus prepared were coupled to the corresponding one of the light emitting diodes in such a manner that they can deflect the lights emitted from the light emitting diodes toward a predetermined target region of a diffusion plate.

Subsequently, the lights emitted from the light emitting diodes were irradiated on the target region of the diffusion plate, as a result of which a white light with a color deviation of 85% was created at the diffusion plate.

The irradiation test was repeatedly conducted with respect to the diode sets in the same manner. It has been confirmed that a homogeneous white light is created and projected over the entire surface of the diffusion plate.

As described in the foregoing, the present invention provides an advantageous effect in that a backlight unit can allow lenses of light emitting diodes, disposed at corners of a polygon or arranged side by side, to irradiate lights asymmetrically on an elliptical area close to a rectangle, thus making it possible to readily perform a local dimming operation in, e.g., color filter-free liquid crystal display devices, while creating a homogeneous white light through the irradiation of red, green and blue lights on the same region of a diffusion plate.

While the invention has been shown and described with respect to the preferred embodiments, it will be understood by those skilled in the art that various changes and modification may be made without departing from the spirit and scope of the invention as defined in the following claims.

What is claimed is:

1. A backlight unit comprising:
   a substrate;
   a plurality of light emitting diodes arranged on the substrate in a spaced-apart relationship with one another for emitting lights; and
   a plurality of lenses coupled to the light emitting diodes in a one-to-one relationship for irradiating the lights emitted from the light emitting diodes in respective directions toward a predetermined target region,
   wherein each of the lenses has an asymmetrical irradiation characteristic that depends on the arrangement of such lens such that the lenses allow the lights to be uniformly mixed with each other, to thereby create a white light, and wherein the lights through the lenses are irradiated in an elliptical shape close to a rectangle toward a top portion of the backlight unit.

2. The backlight unit of claim 1, wherein the lenses have different shapes depending on the positions of the light emitting diodes.

3. The backlight unit of claim 1, wherein the light emitting diodes are disposed at corners of a polygon on the substrate.

4. The backlight unit of claim 1, wherein the light emitting diodes are arranged side by side with respect to one another.

5. The backlight unit of claim 1, wherein the lenses include spherical lenses.

6. The backlight unit of claim 1, wherein the lenses include aspherical lenses.

7. The backlight unit of claim 5, wherein each of the lenses has at least one asymmetrical recess formed on a surface of each of the lenses that makes contact with the respective light emitting diodes.

8. The backlight unit of claim 6, wherein each of the lenses has a plurality of angled protrusions formed on a surface of each of the lenses that makes contact with the respective light emitting diodes.

9. The backlight unit of claim 6, wherein each of the lenses has a convex top surface of an asymmetrical shape.

10. The backlight unit of claim 1, wherein each of the lenses contains a fluorescent material.

11. A light source for use in a backlight unit comprising:
a set of light emitting diodes for emitting red, green and blue lights; and
a set of lenses coupled to the light emitting diodes in a one-to-one relationship for directing the light emitted from the light emitting diodes in respective predetermined direction,
wherein each of the lenses has an asymmetrical irradiation characteristic that depend on the arrangement of such lens such that the lenses allow the lights to be uniformly mixed with each other so as to create a white light, and
wherein the lights through the lenses are irradiated in an elliptical shape close to a rectangle toward a top portion of the backlight unit.

12. The light source of claim 11, wherein each of the lenses has at least one asymmetrical recess formed on a surface of each of the lenses that makes contact with the respective light emitting diodes.

13. The light source of claim 11, wherein each of the lenses has a plurality of angled protrusions formed on a surface of each of the lenses that makes contact with the respective light emitting diodes.

14. The light source of claim 11, wherein each of the lenses has a convex top surface of an asymmetrical shape.

15. The light source of claim 11, wherein each of the lenses contains a fluorescent material.

\* \* \* \* \*

UNITED STATES PATENT AND TRADEMARK OFFICE
CERTIFICATE OF CORRECTION

PATENT NO. : 7,534,008 B2
APPLICATION NO. : 11/431591
DATED : May 19, 2009
INVENTOR(S) : Dae Hyun Kim, Hae Yong Lee and Yong Won Choi It is certified that error appears in the above-identified patent and that said Letters Patent is hereby corrected as shown below:

Col. 9, line 16, "direction" should read --directions--.

Signed and Sealed this

Fifteenth Day of June, 2010

David J. Kappos
*Director of the United States Patent and Trademark Office*